United States Patent [19]

Walker

[11] Patent Number: 5,971,092
[45] Date of Patent: Oct. 26, 1999

[54] VEHICLE DRIVE SYSTEM FEATURING SPLIT ENGINE AND ACCESSORY BACK DRIVE

[75] Inventor: Frank H. Walker, 7271 Green Valley Dr., Grand Blanc, Mich. 48439

[73] Assignee: Frank H. Walker, Grand Blanc, Mich.

[21] Appl. No.: 08/698,140

[22] Filed: Aug. 15, 1996

Related U.S. Application Data

[60] Provisional application No. 60/002,467, Aug. 16, 1995.

[51] Int. Cl.$^6$ .................................................. B60K 6/12
[52] U.S. Cl. .......................... 180/308; 180/165; 180/69.6
[58] Field of Search .................................. 180/69.6, 165, 180/305, 306, 307, 308; 60/709, 714, 716; 123/193.6, 71 R, 71 V, 46 R

[56] References Cited

U.S. PATENT DOCUMENTS

| | | | |
|---|---|---|---|
| 1,386,129 | 8/1921 | Malsbary | 123/71 R |
| 1,951,089 | 3/1934 | Fielder | 180/69.6 |
| 1,953,486 | 7/1934 | Kiep | 60/718 |
| 1,962,782 | 6/1934 | Meister | 180/69.6 |
| 2,000,709 | 5/1935 | Matthews | 180/69.6 |
| 2,084,187 | 6/1937 | Brehob | 60/714 |
| 2,290,703 | 7/1942 | Ormsby | 60/708 |
| 2,366,646 | 1/1945 | Orr | 475/8 |
| 2,791,991 | 5/1957 | Ickes | 123/193.6 |
| 2,954,762 | 10/1960 | DeMartin | 123/71 V |
| 3,194,087 | 7/1965 | Kronogard | 74/661 |
| 3,232,128 | 2/1966 | Burckhardt | 476/11 |
| 3,332,404 | 7/1967 | Lovercheck | 60/700 |
| 3,581,628 | 6/1971 | Williams | 92/73 |
| 3,949,556 | 4/1976 | Wallis | 60/709 |
| 4,027,484 | 6/1977 | Wallis | 60/709 |
| 4,027,485 | 6/1977 | Wallis | 60/709 |
| 4,069,803 | 1/1978 | Cataldo | 123/198 F |
| 4,096,844 | 6/1978 | Mackaness | 123/193 P |
| 4,106,603 | 8/1978 | Walter | 192/85 AB |
| 4,290,270 | 9/1981 | Meeh | 60/716 |
| 4,337,623 | 7/1982 | Kronogard | 60/716 |
| 4,421,217 | 12/1983 | Vagias | 192/98 |
| 4,480,612 | 11/1984 | Yamakawa | 123/198 F |
| 4,481,841 | 11/1984 | Abthoff et al. | 74/661 |
| 4,493,190 | 1/1985 | Yamakawa | 60/714 |
| 4,518,053 | 5/1985 | Queveau | 180/307 |
| 4,566,279 | 1/1986 | Kronogard et al. | 60/718 |
| 4,588,040 | 5/1986 | Albright, Jr. et al. | 180/165 |
| 4,638,637 | 1/1987 | Kronogard et al. | 60/718 |
| 4,662,490 | 5/1987 | Yamakawa | 192/0.07 |
| 4,708,100 | 11/1987 | Luo | 123/193.6 |
| 4,874,057 | 10/1989 | Smith | 180/308 |
| 4,935,689 | 6/1990 | Fujikawa et al. | 60/714 |
| 5,088,041 | 2/1992 | Tanaka et al. | 180/165 |
| 5,398,508 | 3/1995 | Brown | 60/718 |
| 5,794,734 | 8/1998 | Fahl et al. | 180/165 |

OTHER PUBLICATIONS

"EnV'95: Hybrid–electrics are coming", Ward's Auto World; Mar. 1995.

*Primary Examiner*—J. J. Swann
*Assistant Examiner*—Frank Vanaman
*Attorney, Agent, or Firm*—Brooks & Kushman P.C.

[57] ABSTRACT

A drive train for a vehicle having a pair of mechanically driven wheels, a pair of hydraulically driven wheels, and a mechanically driven accessory is disclosed. The drive train includes a transmission system connected to the pair of mechanically driven wheels and to the accessory. A first drive source including an internal combustion engine is connected to the transmission system. A second drive source, operating through a source of stored mechanical energy, is also connected to the transmission system. At least one of the first and second drive sources is capable of driving the pair of mechanically driven wheels by driving the transmission system. One or both of the first and second drive sources can be disengaged from the transmission system so that the vehicle's kinetic energy is transmitted through the transmission system to drive the accessory. The internal combustion engine of the first drive source has a main piston with an inertia piston slidable received therein to increase the volumetric efficiency of the engine.

18 Claims, 4 Drawing Sheets

VEHICLE DRIVE SYSTEM FEATURING SPLIT ENGINE AND ACCESSORY BACK DRIVE

This application claims the benefit of U.S. Provisional Application Ser. No. 60/002,467, filed Aug. 16, 1995.

TECHNICAL FIELD

This invention relates to vehicle drive systems, and more particularly, to vehicle drive systems which employ a plurality of engines which cooperate with one another to drive a vehicle.

BACKGROUND OF THE INVENTION

Accomplishing an 80 miles per gallon fuel economy in an affordable vehicle by early in the next century will require developmental breakthroughs in a number of areas and a high probability of several significant inventions. Ideally, a vehicle with an 80 mpg fuel economy will be efficient, clean, affordable and will be competitive in deliverable performance with today's models such as a Chevrolet Lumina, Ford Taurus, or Chrysler Concorde.

Current automotive passenger car practice is to size the engine large enough to provide the desired acceleration performance at both low speed (standing start) and high speed (passing performance in level and hilly terrain), and then by the selection of gear ratios, to attempt to tailor this large engine to maximize its fuel economy. This practice generally causes the engine to operate most of the time at load points of 10–30% of maximum power, well off from the engine's maximum efficiency point.

In order to overcome this drive efficiency shortcoming, hybrid drive systems have been devised. A series hybrid system is one in which the total power output of the primary engine power source is directed through an intermediate holding device which combines that energy with energy from secondary sources such as that recovered from regenerative braking. The energy is then distributed as required to meet the demands of the vehicle and driver.

Most serious contenders for high fuel economy drive systems up to this time have expressed a preference for a series hybrid system with an undefined storage capability of at least 0.5 kW which acts as a buffer between the power source and the vehicle propulsion system. The advantages of such a system are that the primary power source can be precisely tailored to a specific single power level to maximize its efficiency, and regenerative braking compatible with a storage device can be easily factored into the energy equation. The disadvantages are that additional losses are introduced with multiple interfaces, as the energy finds its way from the power source to the storage device to the propulsion system through several energy converters and controllers.

The requirements of storing 0.5 kW of energy and also providing high braking and propulsion power on the order of 50–60 kW rule out a number of storage systems such as hydraulic accumulators and batteries as presently known. Accumulators are unsuitable because of their limited energy storage capability relative to their size, and batteries because of the high power discharge requirement. This leaves capacitors and flywheels, both of which require inventions to bring them to fruition. High efficiency power converters and controllers are required at both interfaces: engine to storage and storage to propulsion.

The mainstream of the Partnership For New Generation Vehicles (P.N.G.V.) government/industry cooperative programs for hybrid vehicles is directed toward series hybrid electric vehicles because it has not been heretofore demonstrated that any other (parallel) hybrid arrangement will accomplish the goal of fuel efficiency at three times the current industry average.

A parallel hybrid drive system is one which retains two parallel power paths for at least two power sources. Consideration of a parallel hybrid system which keeps a more conventional mechanical driveline in place opens the door for consideration of current technology hydraulic regenerative energy recovery with hydraulic accumulator storage devices having less than 0.1 kW capacity because of the lessened energy and power requirements. The need for an invention now shifts to the powerplant where a much broader high efficiency power spectrum is needed. As has been pointed out by Ross and Wu (SAE 950958), engine mechanical loss is the largest single source of wasted energy between the fuel tank and the road.

SUMMARY OF THE INVENTION

An object of the present invention is to provide a split engine drive system which has a high probability of accomplishing a goal of 80 mpg fuel economy in a parallel hybrid vehicle, one which retains a semblance to current mechanical drive trains as the primary means of propulsion.

It is an additional object to provide a parallel hybrid system which keeps a mechanical drivetrain in place as one branch of the parallel system and eliminates the efficiency losses associated with a series system having two energy converters and two energy controllers for the constant speed drive energy path which occupies a large portion of the highway driving cycle.

The present design relates to an efficient arrangement for obtaining near-optimum efficiency in the operation and packaging of the powertrain for an automotive passenger car. To achieve optimum fuel efficiency, ideally three power sources are available to propel the vehicle as required by a driver's input and a master logic controller for the propulsion system. The key to optimum fuel efficiency is to have each of the three sources available at near-maximum operating efficiency when called upon and to also carry with them a minimum of "baggage" in terms of parasitic losses, mass penalty, manufacturing cost, and packaging complicity during the entire operating cycle of the vehicle.

The present invention provides a scheme for drastically reducing engine mechanical loss using a regenerative energy system to significantly reduce the size of an engine 20%–30% from current practice. This is a realistic target because the regenerative system augments the performance requirements of a smaller low torque engine for acceleration from a standing start up to approximately 40 mph. Above this speed, updated engine breathing technology takes over by increasing the power potential of small engines through improved operation at higher RPM's.

New engine technology, which permits improved breathing at higher rotating speeds, has extended the maximum power capability of smaller engines for improved highway passing and hill climbing performance. However, the need to accelerate rapidly from a standing start has prevented a corresponding reduction in engine displacements because of the need for high torque at low speeds. Regenerative braking and acceleration from a standing start, assisted by stored energy, fills this performance gap for small engines and allows the first ingredient of this design plan to succeed, even if the regenerative braking assist does not extend to the higher speed range.

In addition to the engine downsizing, the operating efficiency at light load constant speed is further improved by splitting the engine into two equal or unequal portions and shutting down the appropriate portion during low power requirements. The preferred packaging scheme has the engines operating in parallel connected back to back taking the power off at a mid connecting point on the engines. This provides the opportunity, when operating at one-third to one-half of the engine total displacement, to actually match the engine operating at peak efficiency to the low power constant speed requirements. In this steady state condition, a single engine operates with approximately 20% to 25% of the displacement currently in practice (a fraction of an engine which has been downsized up to 30%).

Studies have shown that a transverse engine with a longitudinal transmission driving from the center of the engine is one of the most efficient packaging arrangements to minimize vehicle size and mass. Therefore, this particular arrangement for the split engine with center takeoff of the drive complies with the results of these earlier packaging studies.

The multi-cylinder piston engine has a split power shaft or crankshaft, such that either portion may be shut down independently of the other as a fuel saving measure to tailor the engine size to a particular performance requirement. An unequal number of cylinders in the two segments of the engine may provide three displacement options utilizing the smaller engine segment only, the larger engine segment only, or both segments together.

The EPA highway schedule ideally is accomplished with this parallel hybrid system with one segment of the engine shut down 90%–95% of the time as opposed to a buffered engine series proposal where the entire engine is shut down 50%–70% of the time.

In order to further maximize the engine mechanical efficiency, both engines are preferably two strokes per cycle engines, providing one power stroke per revolution, instead of one power stroke per two revolutions as with a four stroke cycle engine. To maximize the volumetric efficiency of the two strokes per cycle engine, small inertia powered free pistons may be installed in the under side of each engine main piston to increase the scavenge volume which feeds the air to the engine.

Preliminary calculations show that volumetric efficiency can be improved 15% to 20% in currently configured engines using this technique. Since engine power is proportional to the air throughput, the indicated power of the engine is increased by this amount, with little or no increase in engine friction.

One advantage of the parallel mechanical hybrid system is the high efficiency of the mechanical drive for the major portion of the energy transmission. Reduction in size and complication of energy storage, controls, and power interfaces are also prominent advantages when comparing the total parallel hybrid system to a series hybrid system.

BRIEF DESCRIPTION OF THE DRAWINGS

These and other features, objects, and advantages of the present invention will become readily apparent from the following description and accompanying sheets of drawings where.

BEST MODE FOR CARRYING OUT THE INVENTION

To be a contender for use in a highly fuel efficient vehicle capable of reaching up to 80 mpg, a drive system should have an extreme reduction from current practice in engine size during constant speed operation, and efficient packaging to allow minimum vehicle mass and aerodynamic resistance. This large size reduction is possible when combining regenerative energy recovery with a split engine concept which totally disengages a portion of the engine during certain operating modes. Because engine friction is the largest single loss in the vehicle propulsion equation, it must be reduced when possible as the highest priority by keeping the engine size to near the minimum required for any given power demand, and stopping one or both engines when not absolutely necessary to have them running.

Figure 1:
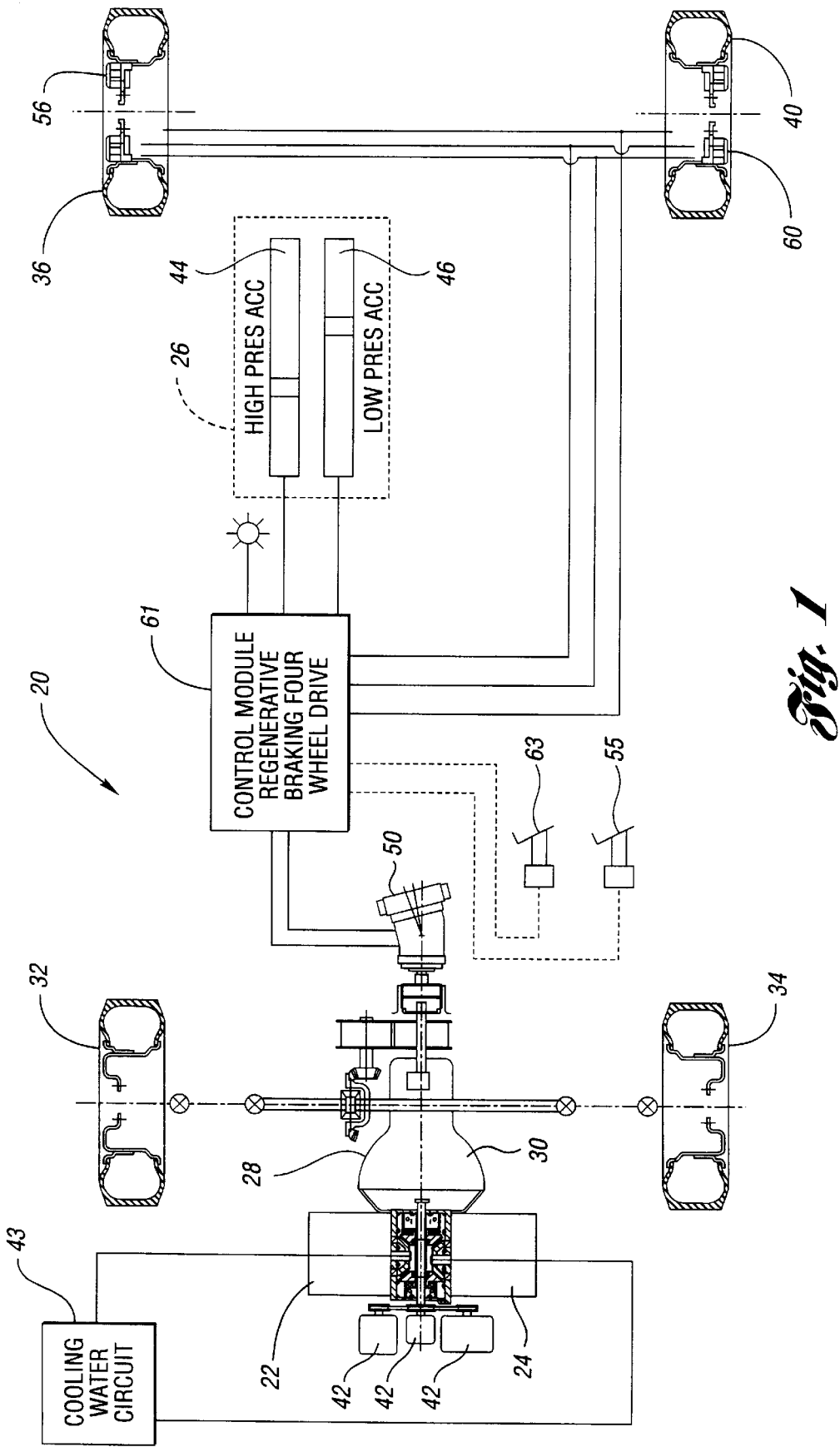
FIG. 1 is a schematic view of a drive system, made in accordance with the present invention, including a pair of engines connected in parallel and cooperating with a fluid accumulator.
Figure 2:
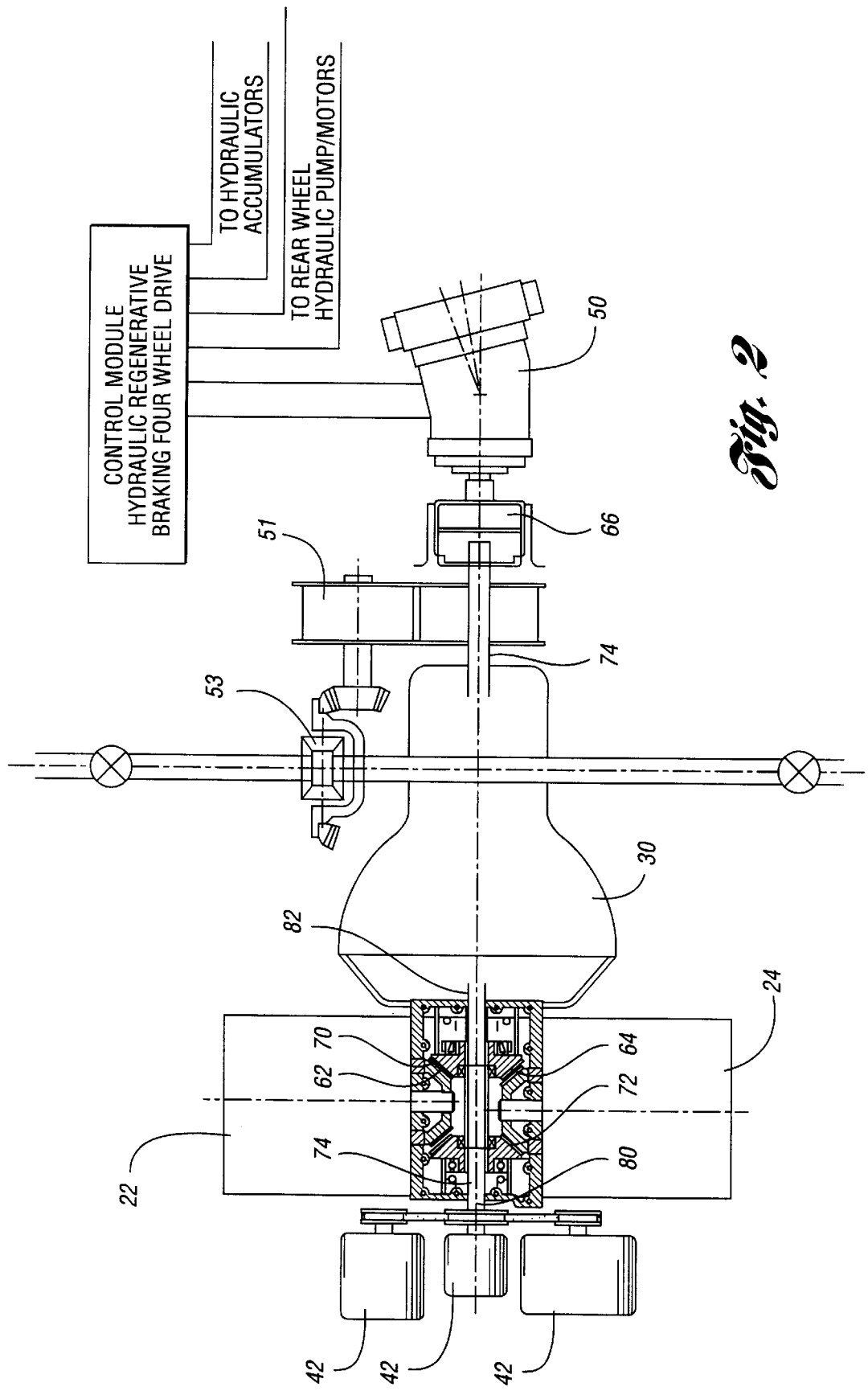
FIG. 2 is an enlarged view of FIG. 1 showing the engines and transmission.

A vehicle drive system 20, made in accordance with the present invention, is shown in FIGS. 1 and 2. Three power sources are labeled 22, 24, and 26 and will be described in detail in the following paragraphs. Each of the three power sources 22, 24 and 26 is connected through a transmission system 30 to propelling wheels 32, 34, 36 and 40 and has its unique speed and torque domain depending on the performance requirements.

Power source 22 is preferably a highly downsized two stroke per cycle internal combustion engine which converts stored energy from a primary fuel tank (not shown) to shaft power. Power source 22 is sized just large enough to overcome wind and rolling resistance at normal cruising speeds of a vehicle. It runs intermittently at times when power is demanded to maintain highway cruising speed. It is programmed to shut off during coast with provisions having been made to insure the adequate performance of "engine" driven accessories 42 by relocating accessories 42 to be driven by backdrive from transmission 30 any time the vehicle is in motion.

Power source 24 is preferably a two stroke internal combustion engine similar to power source 22 in that it converts stored energy from the fuel tank to shaft power, and is programmed to operate intermittently, operating alternately or in concert with power source 22 to keep up with performance demands. Power source 24 can be smaller than, equal to, or larger than power source 22. Also, power sources 22 and 24 can have equal or different number of cylinders per engine. Likewise, they can have identical or substantially different engine displacements.

Power source 26 is ideally a hydraulic device which operates from stored high pressure fluid preferably in a pair of nitrogen charged accumulators 44 and 46. Power source 26 is the only one of the three sources which is reversible in that it can either convert stored fluid energy to shaft power by operating as a fluid motor or it can convert shaft power to stored fluid energy by utilizing a pump/motor hydraulic drive 50, which is preferably a bent axis pump/motor hydrostatic drive. Drive 50 is connected by a mechanical clutch 66 and chain drive 51 to a final drive/differential 53 which mechanically connects with front driven wheels 32 and 34.

Thus, during vehicle deceleration, under the command of the driver by applying force to a brake pedal 55, the drive 50 operates as a regenerative brake to convert vehicle kinetic energy to stored mechanical energy as pressurized fluid. On the subsequent acceleration, the stored energy is converted back to vehicle kinetic energy by passing it through the drive 50. The displacement per revolution of the pump 50 is variable, so that the operating torque is controllable, both in the deceleration mode and in the acceleration mode.

Hydraulic pump/motors units 56 and 60, as described in U.S. Pat. No. 5,323,688 which is hereby incorporated by reference in its entirety, are mounted on wheels 36 and 40 respectively. Pump/motor units 56 and 60 fluidly connect through a control module 61 to fluid accumulator 26. This allows units 56 and 60 to either pump fluid to fluid accumulator 26 during braking or else to receive high pressure fluid therefrom to drive wheels 56 and 60 to assist in accelerating the vehicle. A throttle control 63 and brake control 55 are utilized by a driver to control the speed of the vehicle.

All three power sources 22, 24, and 26 operate through clutches 62, 64 and 66 which can be applied or released. The preferred method for clutching sources 22 and 24 is through one-way clutches which allow overrunning in one direction. By having individual drive gear sets 70 and 72 and downstream clutches for engine sources 22 and 24 to connect to a transmission shaft 74, parasitic losses are minimized because gear sets 70 and 72 rotate only when their respective power sources are operational. Preferably, gear sets 70 and 72 employ spiral bevel gearsets.

Transmission shaft 74 is driven from one or both of the spiral bevel gear sets any time either portion of the engine is operating, and it is also driven by backdrive through the transmission any time the vehicle is in motion even when both engines or power sources 22 and 24 are shut off.

There are five features of this design to modify the vehicle drivetrain 20 which work in concert to greatly improve the efficiency over current practice. The five features are listed and described below.

First, the total engine displacement is decreased by 20–30% by employing regenerative braking, which for driving with stops and starts, can recover as much as 60–80% of the energy now lost as heat in friction brakes. In the Urban portion of the Federal Driving Cycle, currently more than 45% of the energy which reaches the drive wheels is eventually lost as heat in the brakes. With regenerative braking, the energy is stored in hydraulic accumulator 26, and is subsequently used as a secondary power source to assist in bringing the vehicle up to speed on the subsequent acceleration.

Regenerative braking is accomplished by the installation of a hydrostatic driven variable displacement pump/motor 50 on the output shaft 74 of the transmission. The unit acts as a hydraulic pump during deceleration to charge an accumulator and acts as a hydraulic motor during acceleration to recover the stored energy from the accumulator and assist in the vehicle propulsion. The hydrostatic drive unit 50 is declutched from the transmission 30 when not being used to stop or start the vehicle.

Second, this smaller engine is further split into two parts 22 and 24, either of which can be turned off (disengaged) when not required for maintaining near-constant speed, a condition which exists for the majority of the time in highway driving. The "engine" accessories 42, located in the center gearbox section, can be driven by either engine 22 or 24 or by backdrive from the wheels 32, 34, 36 and 40 through transmission system 30. This allows both engines 22 and 24 to be shut off during most coast, braking, and stopped conditions of the driving cycle.

Accessories are directly driven or belt driven from the common transmission shaft 74. The backdrive of transmission shaft 74 from the motion of the vehicle allows for maximum engine shutdown scheduling to accomplish fuel savings while minimizing any compromise in driver or passenger comforts or in vehicle safety by maintaining the output performance of the major accessories such as the air conditioning compressor, alternator, or power steering pump.

The only time the engines 22 and 24 would be required to operate at idle is when there is demand from a cycling air conditioning compressor, and there is not sufficient vehicle motion to backdrive an accessory shaft 80 through the transmission system 30. Power steering will ideally be operated by an all electric system which is being developed in the automotive industry and is now close to production release.

Third, power is taken off the split engines 22 and 24 at their mid point. With engines 22 and 24 mounted transversely in the vehicle, spiral bevel gears 70 and 72 are employed to transmit the engine power to a fore and aft accessory and transmission shafts 82 and 74 and ultimately to the drive wheels 32 and 34. The transverse split engines 22 and 24, with the fore and aft transmission shafts 82 and 74 offer the optimum arrangement to decrease the vehicle overall length for a front or rear engine vehicle and offers the flexibility of either front wheel drive, rear wheel drive, or all wheel drive.

The energy captured from incorporation of regenerative braking and acceleration of the vehicle allows for a significant reduction in total engine size without sacrificing the overall standing start performance. This reduced size engine is further split into two independently operating segments of typically 40% and 60% as described above.

Extracting the power from the center of the engine package has been demonstrated as a very efficient method of packaging with good flexibility for alternate drive systems (e.g. Ford Contour concept car). It follows that transverse split engines, with approximately one half of the engine driving intermittently, when combined with a longitudinal transmission, is a very efficient packaging arrangement. However, none of the prior art for split engines has utilized the packaging arrangement of this invention.

Fourth, the operating engines have very high friction energy losses. Accordingly, it is necessary to turn them off at all times when they are not absolutely required to propel the vehicle or operate the accessories 42. Preferably, a single cooling water circuit 43 circulates through both engines to keep a non operating engine closer to its operating temperature even though its services are not called upon for an extended period of time.

Finally, to maximize the engine efficiency, a two stroke per cycle engine is used, being naturally aspirated by ingesting the air into the crankcase with the lower side of its main pistons. Because of restrictions in the air flow passages into and out of the scavenge area, the volumetric efficiency of a two stroke engine is typically below that of a four stroke engine, while the mechanical efficiency is higher for the two stroke engine because it gets twice as many power strokes in two crankshaft revolutions.

To improve the volumetric efficiency without adding a separate blower, auxiliary small free inertia pistons 114 are added to the under side of each main engine piston 112.

Figure 3:
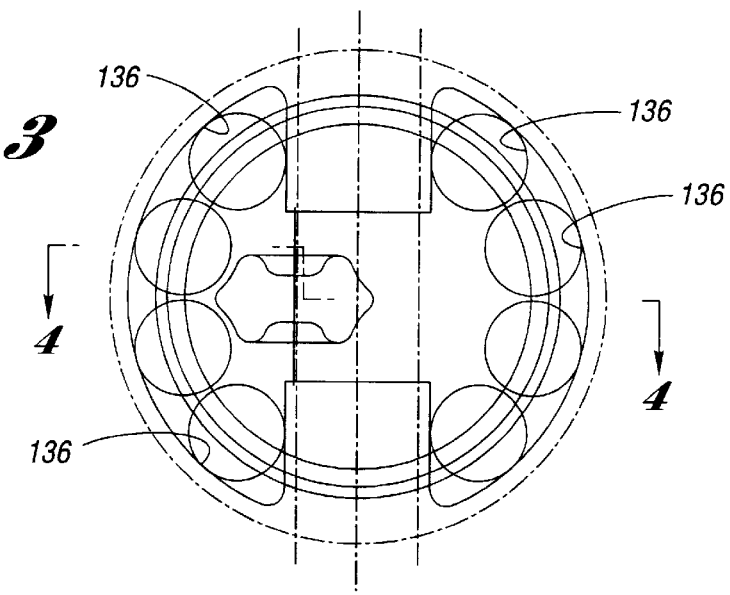
FIG. 3 is a top schematic view of a main piston carrying inertia pistons which may be utilized in an engine of the present invention.
Figure 4:
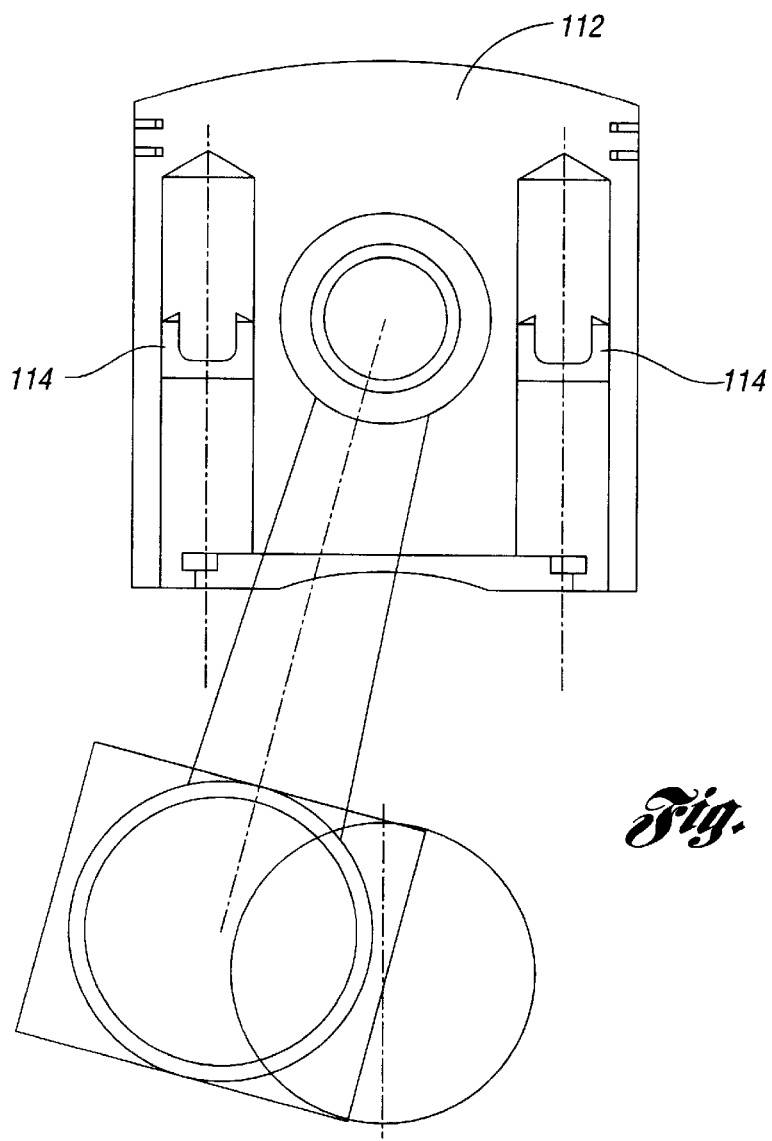
FIG. 4 is a schematic view of the main piston of FIG. 3 taken generally along line 4—4 of FIG. 3.
Figure 5:
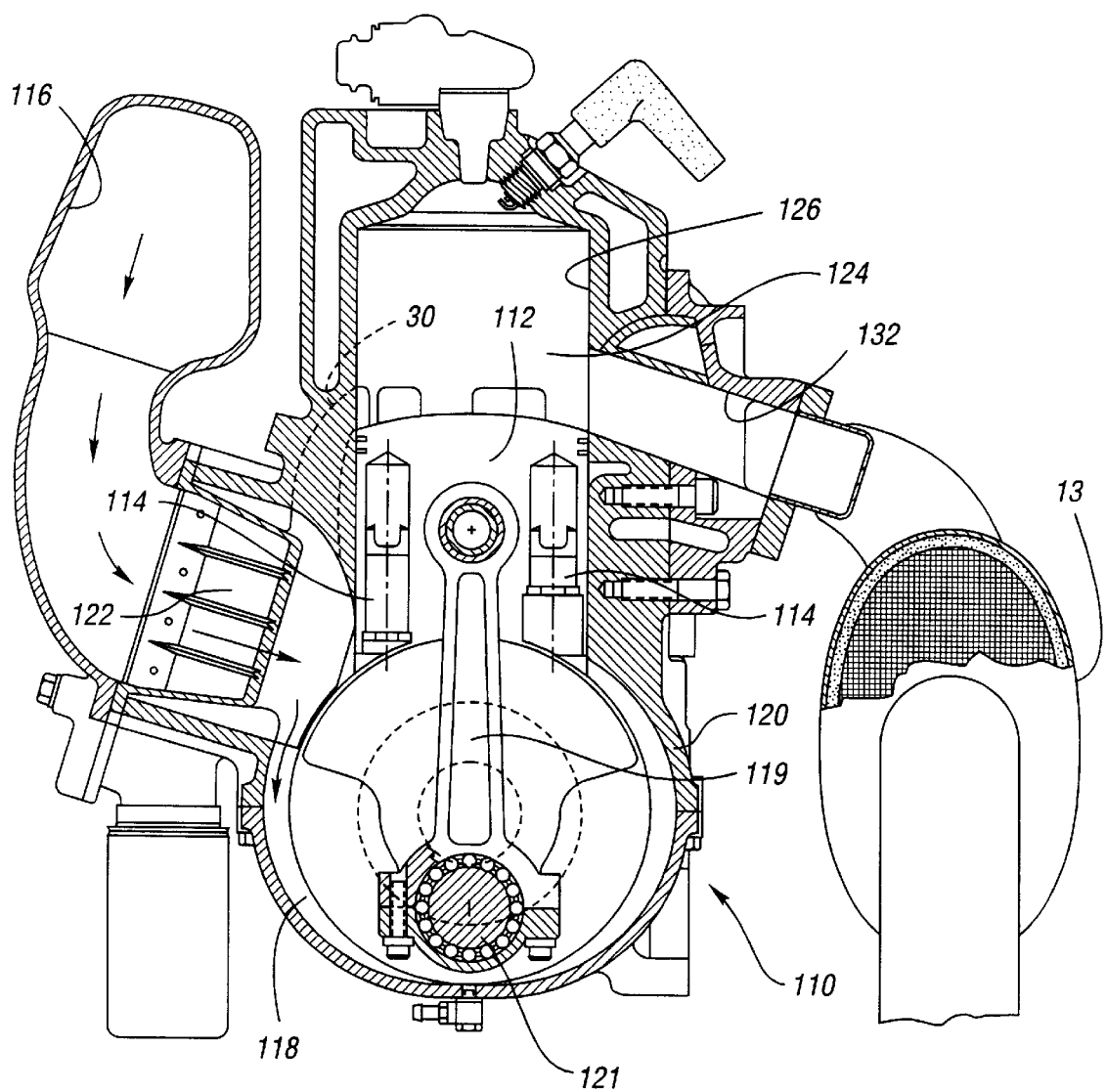
FIG. 5 is a schematic view of a main piston with inertia pistons therein, installed in a two stroke engine, which may be used in the present invention.

Pistons 112 with inertia pistons 114 are shown in FIGS. 3–5. Free pistons 114 are inertia powered, moving up to increase the scavenge volume when engine piston 112 moves to the top of its stroke, and moving down to decrease the scavenge volume when engine piston 112 is at the bottom of its stroke and the scavenge volume is at a minimum to transfer the air to the main engine cylinder where subsequently compression, combustion, and expansion take place. In currently configured engines, increases in volumetric efficiency can be on the order of 15% to 20%. If an engine were newly configured to lengthen the piston and connecting rod, a longer stroke of the inertia pistons 114 could be achieved, and a higher air pumping capacity could be realized. Because indicated power output is proportional to air flow, significant improvements can be realized in the specific power output of the engine.

Brake power output is equal to indicated power minus friction power, so that an increase in indicated power with little or no increase in friction power results in a higher brake power output, an increase in the engine mechanical efficiency, and thus improved specific fuel consumption.

FIG. 5 shows a two stroke engine 110 having main piston 112 in which 8 circumferentially spaced apart inertia pistons 114 are slidably received. The engine has an intake manifold 116 which is in fluid communication with a scavenge area 118 defined between an engine block 120 and main piston 112. A connection rod 119 is driven by a crackshaft 121. A series of one way reed valves 122 allows only one way air flow from intake manifold 116 to scavenge area 118.

A combustion chamber 124 is defined between main piston 112 and a cylinder 126 in which main piston 112 reciprocates. An inlet port 130 extends between scavenge area 118 and combustion chamber 124. After combustion, air exits combustion chamber 124 through an exhaust port 132 to a muffler 134.

Air enters intake manifold 116 and travels downwardly, passing through the series of one-way reed valves 122. Air can only pass in a single direction. Main piston 112 is shown in a down position which minimizes the volume of scavenge area 118. When main piston 114 is in the up position (not shown) after a compression stroke, the volume of scavenge area 118 and the amount of air stored is at a maximum. Note, that when main piston 114 is in the up position, main piston 114 seals off both the scavenge port 130 and exhaust port 132. Not only does scavenge area 118 below main piston 112 increase because of main piston 112 moving upwardly, but manifold area 118 also increases, by approximately 15 to 20 per cent, because the inertia pistons 114 tend to slide to the top of bores 136.

During the compression stroke, air flows through one-way reed valves 122 into the increasing volume beneath the main piston 112. Not only does the volume below main piston 112 increase because main piston 112 is moving upwardly, but the total volume also increases by an additional 15 to 20 percent because the inertia forces cause the inertia pistons 114 to slide to the top of main piston 112 as it is slowing at the top of its stroke. Again, during the power stroke, main piston 112 moves downwardly and near the bottom of the stroke, both the inlet and exhaust ports 130 and 132 open in main cylinder 126. The volume beneath main piston 112 is now at its minimum forcing the air through inlet port 130 in cylinder 126, and in turn, forcing the burned gasses in the combustion chamber 124 out the exhaust port 132. As main piston 112 slows at the bottom of its stroke, inertia forces cause the inertia pistons 114 downward further expending the air in the bores cylinders 136 as well. Through the action of the inertia pistons 114, typically eight per main piston 112, the volumetric efficiency (total air flow) is increased by 15 to 20 per cent. As more air is passed through the engine, more power is developed, and its overall efficiency is increased.

In concert, the above-described drive system features combine to accomplish goals heretofore met only with more expensive and more complex series hybrid systems. The lessened energy storage requirements of a parallel system also open the door for consideration of alternate technology regenerative energy recovery devices such as hydraulic accumulator storage which typically has less than 0.1 kW storage capacity because of weight and size considerations. Parallel systems, because they retain a semblance of the current mechanical drive system, will lend themselves to current automotive tooling and assembly procedures much better than series systems which generally require conversion to an all electric energy storage and distribution system.

While in the foregoing specification this invention has been described in relation to a certain preferred embodiment thereof, and many details have been set forth for the purpose of illustration, it will be apparent to those skilled in the art that the invention is susceptible to alteration and that certain other details described herein can vary considerably without departing from the basic principles of the invention.

For example, the split engine with accessory backdrive and regenerative braking drive system can use either a diesel or a spark ignition engine having either two or four strokes per cycle.

What is claimed is:

1. A drive train for a vehicle having a pair of mechanically driven wheels, a pair of hydraulically driven wheels, and an engine mechanically driven accessory, the drive train comprising:

a first internal combustion engine;

a second internal combustion engine; and a transmission system interconnecting the first and second internal combustion engines, the pair of mechanically driven wheels, and the accessory, wherein the transmission system has an accessory shaft connected to the accessory, wherein the transmission system is capable of connecting the pair of mechanically driven wheels to at least one of the first and second internal combustion engines to drive the vehicle, —wherein one or both of the first and second internal combustion engines can be disengaged from the transmission system so that the vehicle's kinetic energy is transmitted through the transmission system to backdrive the accessory via the accessory shaft while the vehicle is traveling at a constant speed;

wherein the first internal combustion engine is a two stroke per cycle engine including:

an engine block having a cylinder, the cylinder having an intake port and an exhaust port;

a main piston moving between an upward compression stroke position and a downward power stroke position within the cylinder, the main piston having a top portion and a bottom portion, the top portion and the cylinder defining a combustion chamber therebetween for fuel combustion, the combustion chamber being in communication with the intake port and the exhaust port, the main piston sealing off the combustion chamber from the intake port and the exhaust port when it is in the compression stroke position the bottom portion and the engine block defining a scavenge area therebetween, the scavenge area being in communication with the intake port, the bottom portion of the main piston having at least one bore extending within the main piston;

an intake manifold providing air through he intake port to the combustion chamber when the main piston moves away from the compression stroke position to facilitate fuel combustion in the combustion chamber, the intake manifold further providing air to the scavenge area; and at least one inertia piston slidably received within the at least one bore of the main piston, the at least one inertia piston moves up within the at least one bore when the main piston moves up to the compression stroke position thereby increasing the volume of the scavenge area available for receiving air from the intake manifold the at least one inertia piston moves down within the at least one bore when the main piston moves down to the power stroke position after fuel combustion thereby decreasing the volume of the scavenge area forcing air within the scavenge area through the intake port to carry the burned fuel in the combustion chamber out the exhaust port.

2. The drive train of claim 1 wherein the first and second internal combustion engines are transversely mounted in the vehicle.

3. The drive train of claim 1 wherein the first and second internal combustion engines are connected in parallel to the transmission system.

4. The drive train of claim 1 wherein a further drive source is a fluid accumulator.

5. The drive train of claim 1 further comprising a hydraulic drive operatively associated with a further drive source and connected to the pair of mechanically driven wheels, wherein the hydraulic drive provides said further drive source with mechanical energy by converting the vehicle's kinetic energy to mechanical energy during braking of the vehicle and transmits mechanical energy from said further drive source through the transmission system to drive the pair of mechanically driven wheels during acceleration of the vehicle.

6. The drive train of claim 1 further comprising a pair of hydraulic units operatively associated with a further drive source and connected to a respective one of the pair of hydraulically driven wheels, wherein the hydraulic units provide said further drive source with mechanical energy by converting the vehicle's kinetic energy to mechanical energy during braking of the vehicle and transmit mechanical energy from said further drive source through the transmission system to drive the pair of hydraulically driven wheels during acceleration of the vehicle.

7. A drive train for a vehicle having a pair of mechanically driven wheels, a pair of hydraulically driven wheels, and an engine mechanically driven accessory, the drive train comprising:

a first internal combustion engine;

a second internal combustion engine;

a transmission system interconnecting the first internal combustion engine, the second internal combustion engine, the pair of mechanically driven wheels, and the accessory, wherein the transmission shaft has an accessory shaft connected to the accessory, wherein the transmission system is capable of connecting the pair of mechanically driven wheels to at least one of the first and second internal combustion engines to drive the vehicle, wherein one or both of the first and second internal combustion engines can be disengaged from the transmission system so that the vehicle's kinetic energy is transmitted through the transmission system to backdrive the accessory via the accessory shaft while the vehicle is traveling at a constant speed, wherein the transmission system has a transmission shaft connected to the pair of mechanically driven wheels, wherein the first and second internal combustion engines are connected to a first end of the transmission shaft and the hydraulic drive is connected to a second end of the transmission shaft;

a fluid accumulator for storing and providing mechanical energy;

a hydraulic drive operatively associated with the fluid accumulator and connected to the transmission system to the pair of mechanically driven wheels, wherein the hydraulic drive provides the fluid accumulator with mechanical energy by converting the vehicle's kinetic energy to mechanical energy during braking of the vehicle and transmits mechanical energy from the fluid accumulator through the transmission system to drive the pair of mechanically driven wheels during acceleration of the vehicle;

a pair of hydraulic units operatively associated with the fluid accumulator and connected to a respective one of the pair of hydraulically driven wheels, wherein the hydraulic units provide the fluid accumulator with mechanical energy by converting, the vehicle's kinetic energy to mechanical energy during braking of the vehicle and transmit mechanical energy from the fluid accumulator through the transmission system to drive the pair of hydraulically driven wheels during acceleration of the vehicle;

a clutch connecting the first internal combustion engine to the first end of the transmission shaft; and a gear set connecting the clutch to the first internal combustion engine, wherein the gear set rotates only when the first internal combustion engine is operational to minimize parasitic losses associated with rotating gear sets.

8. The drive train of claim 7 wherein the first and second internal combustion engines are connected in parallel to the first end of the transmission shaft.

9. The drive train of claim 7 wherein the first and second internal combustion engines are transversely mounted in the vehicle.

10. The drive train of claim 7 wherein the gear set is a spiral bevel gear set.

11. The drive train of claim 7 wherein the hydraulic drive is a hydrostatic driven variable displacement pump/motor.

12. The drive train of claim 7 further comprising a cooling water circuit circulating through the engines to keep the temperature of the engines at their operating temperature when they are disengaged from the transmission system.

13. The drive train of claim 7 further comprising a control module, the control module connects the hydraulic units and the hydraulic drive with the fluid accumulator.

14. A two stroke per cycle engine comprising:

an engine block having a cylinder, the cylinder having an intake port and an exhaust port;

a main piston moving between an upward compression stroke position and a downward power stroke position within the cylinder, the main piston having a top portion and a bottom portion, the top portion and the cylinder defining a combustion chamber therebetween for fuel combustion, the combustion chamber being in communication with the intake port and the exhaust port, the main piston sealing off the combustion chamber from the intake port and the exhaust port when it is in the compression stroke position, the bottom portion and the engine block defining a scavenge area therebetween, the scavenge area being in communication with the intake port, the bottom portion of the main piston having at least one bore extending within the main piston;

an intake manifold providing air through the intake port to the combustion chamber when the main piston moves away from the compression stroke position to facilitate fuel combustion in the combustion chamber, the intake manifold further providing air to the scavenge area; and at least one inertia piston slidably received within the at least one bore of the main piston, the at least one inertia piston moves up within the at least one bore when the main piston moves up to the compression stroke position thereby increasing the volume of the scavenge area available for receiving air from the intake manifold, the at least one inertia piston moves down within the at least one bore when the main piston moves down to the power stroke position after fuel combustion thereby decreasing the volume of the scavenge area forcing air within the scavenge area through the intake port to carry the burned fuel in the combustion chamber out the exhaust port.

15. The two stroke per cycle engine of claim 14 wherein the at least one bore includes eight circumferentially spaced apart bores.

16. The two stroke per cycle engine of claim 15 wherein the at least one inertia piston includes eight inertia pistons.

17. The two stroke per cycle engine of claim 14 further comprising a series of one way reed valves within the intake manifold.

18. A drive train for a vehicle having a pair of mechanically driven wheels, a pair of hydraulically driven wheels, and an engine mechanically driven accessory, the drive train comprising:

a first internal combustion engine;

a second internal combustion engine;

a transmission system interconnecting the first internal combustion engine, the second internal combustion engine, the pair of mechanically driven wheels, and the accessory, wherein the transmission shaft has an accessory shaft connected to the accessory, wherein the transmission system is capable of connecting the pair of mechanically driven wheels to at least one of the first and second internal combustion engines to drive the vehicle, wherein one or both of the first and second internal combustion engines can be disengaged from the transmission system so that the vehicle's kinetic energy is transmitted through the transmission system to backdrive the accessory via the accessory shaft while the vehicle is traveling at a constant speed;

a fluid accumulator for storing and providing mechanical energy;

a hydraulic drive operatively associated with the fluid accumulator and connected to the transmission system to the pair of mechanically driven wheels, wherein the hydraulic drive provides the fluid accumulator with mechanical energy by converting the vehicle's kinetic energy to mechanical energy during braking of the vehicle and transmits mechanical energy from the fluid accumulator through the transmission system to drive the pair of mechanically driven wheels during acceleration of the vehicle and a pair of hydraulic units operatively associated with the fluid accumulator and connected to a respective one of the pair of hydraulically driven wheels wherein the hydraulic units provide the fluid accumulator with mechanical energy by converting the vehicle's kinetic energy to mechanical energy during braking of the vehicle and transmit mechanical energy from the fluid accumulator through the transmission system to drive the pair of hydraulically driven wheels during acceleration of the vehicle;

wherein the first internal combustion engine is a two stroke per cycle engine including:

an engine block having a cylinder, the cylinder having an intake port and an exhaust port;

a main piston moving between an upward compression stroke position and a downward power stroke position within the cylinder, the main piston having a top portion and a bottom portion, the top portion and the cylinder defining a combustion chamber therebetween for fuel combustion, the combustion chamber being in communication with the intake port and the exhaust port, the main piston sealing off the combustion chamber from the intake port and the exhaust port when it is in the compression stroke position, the bottom portion and the engine block defining a scavenge area therebetween, the scavenge area being in communication with the intake port, the bottom portion of the main piston having at least one bore extending within the main piston;

an intake manifold providing air through the intake port to the combustion chamber when the main piston moves away from the compression stroke position to facilitate fuel combustion in the combustion chamber, the intake manifold further providing air to the scavenge area; and at least one inertia piston slidably received within the at least one bore of the main piston, the at least one inertia piston moves up within the at least one bore when the main piston moves up to the compression stroke position thereby increasing the volume of the scavenge area available for receiving air from the intake manifold, the at least one inertia piston moves down within the at least one bore when the main piston moves down to the power stroke position after fuel combustion thereby decreasing the volume of the scavenge area forcing air within the scavenge area through the intake port to carry the burned fuel in the combustion chamber out the exhaust port.

\* \* \* \* \*